United States Patent [19]

Johns et al.

[11] Patent Number: 4,874,842

[45] Date of Patent: Oct. 17, 1989

[54] PROCESS FOR CURING THERMOSETTING RESINS BY MEANS OF A LIQUID HEAT TRANSMITTER

[75] Inventors: Ken Johns, Asford, Great Britain; Alberto Re; Gianangelo Bargigia, both of Milan, Italy

[73] Assignee: Ausimont S.p.A., Milan, Italy

[21] Appl. No.: 180,892

[22] Filed: Apr. 13, 1988

[30] Foreign Application Priority Data

Apr. 17, 1987 [IT] Italy .................................. 20167 A/87

[51] Int. Cl.$^4$ ............................................. C08G 59/14
[52] U.S. Cl. ....................................... 528/494; 528/48; 528/88; 528/353; 528/481; 528/503; 525/330.3; 525/331.9; 264/236; 264/247; 522/107; 522/114; 522/127; 522/170

[58] Field of Search .................... 528/494, 88, 48, 353, 528/481, 503; 264/236, 247; 525/330.3, 331.9; 522/107, 114, 127, 170

[56] References Cited

U.S. PATENT DOCUMENTS

| | | | |
|---|---|---|---|
| 3,177,193 | 4/1965 | Scott | 528/483 X |
| 4,517,356 | 5/1985 | Lambert et al. | 528/491 X |
| 4,732,961 | 3/1988 | Oka | 528/88 X |

*Primary Examiner*—Earl Nielsen
*Attorney, Agent, or Firm*—Stevens, Davis, Miller & Mosher

[57] ABSTRACT

The present invention relates to a method for hot curing thermosetting resins and vulcanizable elastomers, based on the use of perfluoropolyethers in the liquid state as heat transfer media.

6 Claims, No Drawings

PROCESS FOR CURING THERMOSETTING RESINS BY MEANS OF A LIQUID HEAT TRANSMITTER

The present invention relates to a method for currying out the hot cure of thermosetting resins or vulcanizable elastomers, based on the use of a specific product, in the liquid state as a heat medium.

In Japanese patent No 58141213 a method is described for curing, in the liquid phase, thermosetting resins such as epoxy resins, unsaturated polyesters, polyurethane and polybutadiene resins, by using, as liquid medium, glycerin, ethyleneglycol and wax or petroleum resins (paraffins), which are liquid at the processing temperature.

Also in Swedish patent No 6714/82 a process is claimed for curing a resin strengthened with fiber glass, in the liquid phase, by using, for the heat transmission, liquids similar to the ones cited hereinbefore.

The processes according to the cited prior art, do not lead to results useful to the electronic industry because, for instance, the electric conductivity of the cured resins, when they are used for electronic circuits, is not high enough.

Moreover the liquid transmitters mentioned hereinbefore, do not provide the necessary high chemical inertness as to the vulcanizable material, in order to obtain high quality manufactures.

A few known processes concerning the vulcanization of thermosetting resins, make use of a saturated vapor coming from a liquid kept at the boiling temperature, as a heating medium. See in this connection U.S. Pat. No. 4,517,356. This method, although it makes it possible to cure at a perfectly control led and homogeneous temperature in a very short time and with good results, presents, however, the drawback that, the operating temperature is determined by the boiling point of the liquid which has been used, and should it necessary to change this temperature to adjust it to a different kind of resin or to a different process, the liquid should be changed as well. We have now found surprisingly that, by using a specific liquid as heating medium, the drawbacks concerning the above mentioned vulcanization in the vapor phase may be overcome and a better process in the liquid phase may be provided, to be used, in particular, for the electronic industry.

In fact, the process according to the present invention, makes it possible to select everytime the most convenient conditions of temperature, always using the same liquid.

Moreover, the process, that makes use of a heating fluid in the vapor phase, needs complex equipment in order to avoid losses of the liquid product due to vapor escape, whereas in the process according to the present invention, the loss of the liquid product due to evaporation, may be very low, when liquid is selected having a low vapor tension.

Another advantage of the process according to the present invention, consists in that, it makes it possible to carry out a multistep curing process, with different vulcanization temperatures in each step, by using the same liquid in all the steps; in the vapor phase, on the contrary, use has to be made in each step of a different kind of liquid having a different boiling point, corresponding to the temperature conditions of each step, but in practice the possibility of changing the thermal profile of each step, is limited by the kind of system.

In general, the system in vapor phase involves the pollution problem of the new liquid with the old one, when the liquids change from one step to the other.

The method of the present invention consists essentially in bringing into contact the article to be cured with the process liquid kept at a pre-established temperature and for a period of time sufficient to obtain the complete vulcanization.

The contact between the process liquid and the material to be cured, can be obtained in the most simple way, by dipping the article into a bath containing the liquid at the desired temperature. Alternatively it can be carried out by means of a customary spray system or by dipping into a film of liquid as well.

In the case of dipping into a bath the heat-exchange coefficient can be improved by keeping the liquid under stirring.

The liquid products used as heat transfer media according to the invention belong to the class of the perfluoropolyethers of neutral kind, namely without reactive terminal groups, having perfluoroalkyl terminal groups and very low vapor tension under the process conditions.

For instance at 150° C. the evaporation loss according ASTM D 976/56 rules is lower than 1% by weight. Products having viscosity at 20° C. ranging from 10 to 2500 Cst prove to be suitable for this invention.

Therefore the object of the present invention concerns fluids having a perfluoropolyether structure, comprising structural units of the following kind:

(1) $(CF(CF_3)CF_2O)$ and $(CFXO)$ randomly distributed along the perfluoropolyether chain, wherein X is F, $-CF_3$;

(2) $(CF(CF_3)CF_2O)$;

(3) $(CF(CF_3)CF_2O)$, moreover this class comprises the characteristic structural unit $-CF(CF_3)-CF(CF_3)$;

(4) $(CF(CF_3)CF_2O)$, $(C_2F_4O)$ $CFXO$ randomly distributed along the perfluoropolyether chain, wherein X is F, $CF_3$;

(5) $(C_2F_4O)$, $(CF_2O)$ randomly distributed along the perfluoropolyether chain;

(6) $(CF_2-CF_2-CF_2O)$;

(7) $(C_2F_4O)$;

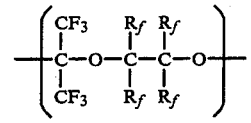

(8)

wherein $R_f$ is F or a perfluoroalkyl radical; and such that the viscosity, measured at 20° C. is at least 10 Cst and 2500 Cst at the most.

The perfluoropolyethers containing the units claimed hereinbefore are known and are selected preferably among the following classes:

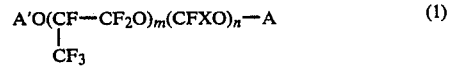

(1)

wherein X is $-F$, $-CF_3$; A and A', which may be the same or different, may be $-CF_3$, $C_2F_5$, $C_3F_7$, the $(CF(CF_3) CF_2O)$ and $CFXO$ units are randomly distributed along the perfluoropolyether chain, m and n are whole numbers, n may be 0 and the m/n ratio is 2, when n=0 and
such that the viscosity ranges from 10 to 2500 Cst.

These perfluoropolyethers have been obtained by photooxidation reaction of hexafluoropropene according to the process described in U.K. patent No. 1,104,482 and by subsequent conversion of the terminal groups into inert groups according to the process described in U.K. patent No. 1,226,566.

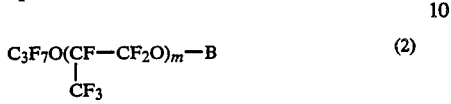
(2)

wherein B may be $-C_2F_5$, $-C_3F_7$ and m is a positive whole number and such that the viscosity of the product ranges within the values as indicated hereinbefore. These compounds are prepared by ionic oligomerization of hexafluoropropene epoxide and subsequent treatment of acyl fluoride (COF) with fluorine, according to the processes shown in U.S. Pat. No. 2,242,218.

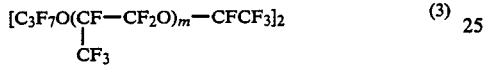
(3)

wherein m is a whole number, such that the product viscosity falls within the range considered hereinbefore. These products have been obtained by ionic telomerization of hexafluoropropene epoxide and subsequent photochemical dimerization of acyl fluoride, according to the processes described in U.S. Pat. No. 3,214,478.

$$A'O[CF(CF_3)CF_2O]_m-(C_2F_4O)_n(CFXO)_qA \quad (4)$$

wherein A and A', which may be the same or different, may be $-CF_3$, $-C_2F_5$, $-C_3F_7$; X is $-F$, $-CF_3$; m, n and q are whole numbers and may be equal to 0 as well, but in any case they are such that the viscosity falls within the range indicated hereinbefore. These products have been obtained by photooxidation of mixtures of $C_3F_6$ and $C_2F_4$ and subsequent treatment with fluorine, according to the process described in U.S. Pat. No. 3,665,041.

$$CF_3O(C_2F_4O)_p(CF_2O)_q-CF_3 \quad (5)$$

wherein p and q are whole numbers, which may be the same or different, in which the p/q ratio ranges from 0.5 to 2 and it is such that the viscosity falls within the ranges indicated hereinbefore. These perfluoropolyethers have been prepared according to what is described in U.S. Pat. No. 3,715,378, subsequently treated with fluorine according to U.S. Pat. No. 3.665.041.

$$AO-(CF_2-CF_2-CF_2O)_m-A' \quad (6)$$

wherein A and A', which may be the same or different, may be $-CF_3$, $-C_2F_5$, $-C_3F_7$ and m is a whole number such that the product viscosity ranges within the values indicated hereinbefore. These products have been obtained according to European patent No. EP 148,482.

$$DO-(CF_2-CF_2O)_r D' \quad (7)$$

wherein D and D', which may be the same or different, may be $-CF_3$, $-C_2F_5$, and r is a whole number such that the product viscosity ranges within the values indicated hereinbefore. These products have been obtained according to U.S. Pat. No. 4,523,039.

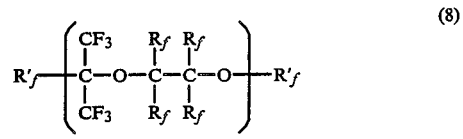
(8)

wherein $R'_f$ is a perfluoroalkyl radical, n is at least 8, $R_f$ is F or a perfluoroalkyl radical. These perfluoropolyethers are described in patent application No. PCT WD 87/00538.

The above described perfluoropolyethers show a high degree of the following essential properties:
they are not flammable;
stability at high temperatures;
good coefficient of heat transfer;
chemical inertness;
lack of solid residue;
good compatibility with the materials used in the electronic apparatuses;
low viscosity at the utilization temperatures;
low surface tension (good wettability and drainage);
high specific heat.

The characteristic, that above all differentiates the liquid products of the invention from those of the prior art is the high compatibility of such products with all the thermosetting resins, such as epoxy, polyurethane, polyester, acrylic, polybutadiene, polyimide resins. The compatibility is based substantially on the following properties:
lack of any chemical reaction with the resin before, during and after curing;
no (or very low) capability of dissolving the resin and lack of absorption and/or of gelling phenomena before, during or after curing.

Another advantageous characteristic of the perfluoro polyesters mentioned hereinbefore for the specific use of the present invention, is the complete lack of toxicity, smell or irritant properties.

A further object of the present invention consists in that, the curing process may be carried out in combination, simultaneously or in sequence, with electronic radiations, U.V. radiations, microwaves or ultrasounds; these different energetic sources may be used singly or together.

An advantage in the use of U.V. radiations in combination with the vulcanization in the liquid phase of the present invention consists in that, the harmful effects are eliminated of the atmospheric oxygen, inhibiting strongly the induced radicalic polymerization.

By using microwaves in combination with the present process, the energy excess coming from the microwaves, particularly in polymers containing a metal, may be dissipated by the fluid, in order to improve the thermal control of the system.

By using ultrasound in combination with the thermal treatment of the present invention, it is possible to exploit the heat, that has been generated inside by the ultrasound and, at the same time, the heat supplied from the outside by the liquid medium described in the present invention.

The vulcanization in the liquid phase, according to the present invention makes it possible to control or to increase the speed of the surface vulcanization, in order to provide a better, unsticky surface, cured outside, but allowing, at the same time, a preliminary handling before the complete vulcanization.

Therefore the complete vulcanization may be carried out by using a curing agent in the liquid phase, optionally in the presence of the energetic sources mentioned hereinbefore.

For the practical application of the process described in the present invention the contact between the heating liquid and the article to be heated, may be carried out in several ways, for instance:
by dipping into the liquid,
by spraying of the liquid,
by crossing through a wave of liquid.

Should the resin to be cured be present in the form of particularly complicated articles, comprising, for instance, electronic components, which are fastened during the curing process in printed circuits, it is sometimes advisable, in order to avoid some shiftings of the components, to wrap the article in polymeric films, which are resistant at the utilization temperature of the liquid.

This polymeric film can be used in order to restrain the volume increase taking place during the vulcanization and/or the gas elimination during the starting vulcanization step and therefore to act as a continuous heat transmitter.

The wrapping may be carried out according to the technique of vacuum wrapping or according to shrink wrapping.

In fact, it has been shown that such films do not influence negatively the speed of heat transmission from the liquid to the resin to be cured.

The protective film can be also used to avoid the inclusion of the heating liquid in highly delicate manufactures such as, for instance, printed circuits comprising electronic components, which can be sensitive to the liquid.

The articles subjected to the process according to the invention, can be washed afterwards with a specific solvent in order to remove the residual heating liquid.

Suitable solvents are fluorinated or chlorofluorinated hydrocarbons such as Algofrene ® 113 (trichlorotrifluoroethane).

As application examples of the present invention we can cite the vulcanization of parts of epoxy resins present in printed circuits, coatings consisting of thermosetting resins, couplings achieved by using thermosetting resins as binders.

The resin that can be cured according to the present invention, is any vulcanizable material which can be cured by thermal treatment.

As above mentioned, examples of these materials are thermosetting resins, thermally vulcanizable thermoplastic compositions, for instance PVC containing plastisol, elastomeric compositions such as EPR, EPDM and cross linkable polymers such as polyolefins XLPE, CPE, CSM.

With the process of the present invention it is possible to reduce, eliminate or modify some additives used for curing the resins, i.e. catalysts, accelerators, initiators and curing agents such as peroxides.

As the temperature is well controlled and the process is carried out without oxidative degradation, it is possible to operate at higher temperatures compared with those of the customary systems.

The temperature control joined to the high speed of heat transmission may allow a quick and effective vulcanization at lower temperatures than those used previously in the prior art.

The following examples will be given merely by way of illustration, but not of limitation of the present invention.

EXAMPLE 1

A mixture was prepared consisting of 100 parts by weight of an epoxy resin made from bisphenol A and epichlorohydrin, having epoxy equivalent weight=190, of 90 parts by weight of methyl endomethylene tetrahydrophthalic anhydride and of 1 part by weight of N-butyl imidazole.

The mixture was pre-cross-linked at 100° C. over 1 hour, afterwards it was cross-linked at 165° C. according to two methods:
(a) in a heating plate oven (comparison test);
(b) in a liquid phase, by dipping into perfluoropolyether having the structure of Fomblin ® YR type and having the following properties:
(viscosimetric)
average molecular weight: 6000-7000
density at 20° C.: 1.92 g/ml
distillation range (0.5 m.bar): >270° C.
kinematic viscosity at 20° C.: 1000-2000 Cst.
heat conductivity at 25° C.: 0.00021 cal/sec. cm. °C.
surface tension at 20° C.: 21 dynes/cm.
(Fomblin YR: Perfluoropolyether having the formula

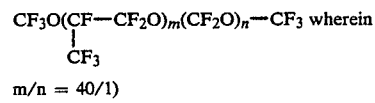

m/n = 40/1)

Moreover the above described perfluoropolyether presents absolute chemical inertness and compatibility towards polymeric materials.

The results of the tests carried out over different times, are set forth in Table 1.

TABLE 1

| Heating time | Glass transition (Tg) °C. | |
|---|---|---|
| (min.) | Oven | Liquid phase |
| 1 | 55 | 70 |
| 3 | 65 | 98 |
| 8 | 137 | 148 |

2 hours in the oven and 13 minutes in the liquid phase are required to achieve the highest value (Tg=160° C.).

The glass transition temperature was measured by differential thermal analysis at heating rate=16° C./min.

EXAMPLE 2

A mixture was prepared consisting of 100 parts by weight of an epoxy resin made from bisphenol A and epichlorohydrin, having epoxy equivalent weight equal to 190, of 75 parts by weight of methyl-endomethylene-tetra-hydrophthalic anhydride and of 1 part by weight of N-butyl imidazole.

The mixture was pre-cross-linked at 100° C. over 1 hour, afterwards it was cross-linked at 190° C. and 215° C., according to methods A and B described in Example 1.

The results are set forth in Table 2.

TABLE 2

| curing time | Tg (°C.) | | | |
|---|---|---|---|---|
| | 190° C. | | 215° C. | |
| | oven | liquid phase | oven | liquid phase |
| 1 | 52 | 58 | 60 | 95 |
| 3 | 52 | 117 | 67 | 123 |
| 5 | 56 | 133 | 105 | 133 |
| 7 | 107 | 137 | — | — |

EXAMPLE 3

Two pressure sensitive adhesive tapes having a thickness of about 0.15 mm were stuck parallelly at a distance of 5 mm, on polyester supports having a thickness of 0.2 mm, coated with a silica layer having a thickness of 0.25 mm.

The two component Epotek ® H20 resin (containing Ag in the form of finely dispersed powder) was spread between the two tapes in order to form a definite track. The resin was pre-treated at 50° C. over 30 minutes, before being applied on the board. (Epotek ® H20 is an epoxy resin.)

The adhesive tapes were removed and the resin was cross-linked both in an oven and in a liquid phase as specified hereinafter.

Two sets of tests were carried out, by heating the boards at 150° C. in a heating plate oven and by dipping into perfluoropolyether of the kind described in Example 1.

The results are set forth in Table 3. The specimens were kept for 20 hours in a drier, before the measures were carried out.

The volumetric resistivity was measured by Thiedig Milli-TO.2 method in a cell built on purpose according to UN 5608 method (measuring method type 4 electrode Kelvin), after having measured carefully the track size by means of a digital micrometer and a graduated optical visual apparatus.

TABLE 3

| curing time | Volum. resistivity ($\Omega \cdot$ cm/25° C.) | |
|---|---|---|
| | oven | liquid phase |
| 1 | it does not polymerize | $0.5 \cdot 10^{-4}$ |
| 5 | $0.6 \cdot 10^{-4}$ | $0.5 \cdot 10^{-4}$ |

EXAMPLE 3A

After having removed the adhesive tape from the polyester support as in example 3, two sets of tests were carried out, by heating the boards both in a heating plate oven at 160° C. and in vapors of perfluoropolyethers belonging to class 1 described hereinbefore and having a distillation range of 158°–167° C. The results are set forth in Table 4.

TABLE 4

| Heating time | Resistivity (ohm × cm.) | |
|---|---|---|
| | oven | vapor |
| 2 minutes | $1.80 \cdot 10^{-4}$ | $1.28 \cdot 10^{-4}$ |
| 1 minute and 30 sec. | it does not polymerize | $1.29 \cdot 10^{-4}$ |
| 45 seconds | it does not polymerize | $1.30 \cdot 10^{-4}$ |

The volumetric resistivity was measured according to the method indicated in example 1.

EXAMPLE 4

Example 3 was repeated, by heating the boards either in a heating plate oven or by dipping in perfluoropolyether phase at 175° C. The results are set forth in Table 5.

TABLE 5

| curing time | Volum. resistivity ($\Omega \cdot$ cm/25° C.) | |
|---|---|---|
| | oven | liquid phase |
| 30 sec. | it does not polymerize | $0.5 \cdot 10^{-4}$ |
| 1 min. | $1.6 \cdot 10^{-4}$ | $0.5 \cdot 10^{-4}$ |
| 5 min. | $0.5 \cdot 10^{-4}$ | $0.5 \cdot 10^{-4}$ |

EXAMPLE 5

A $C_2H_4$, $C_3H_6$, ethylidenenorbornene (ENB) terpolymer (65.5; 31; 3.5% by weight respectively) having the trade-mark Dutral Ter 038, was used to prepare a mix having the following composition:
elastomer EPDM: 100 parts by weight
carbon black FEF: 55 parts by weight
paraffin oil: 30 parts by weight
zinc oxide: 5 parts by weight
stearic acid: 1 parts by weight
tetramethyl thiuram monosulfide: 1,5 parts by weight
mercapto benzothiazole: 0,75 parts by weight
sulfur: 1,5 parts by weight It was extruded in shapes having a rectangular section of 35×1,5 mm., from which specimens were obtained, being about 10 cm in length. The specimens were cross-linked by dipping into a bath containing Fomblin YR, whose characteristics had been set forth in Example 1.

A set of tests was carried out at 3 different temperatures; the results are set forth in Table 6. The measurements were obtained according to ASTM D412 rules (Tensile stress, ultimate elongation, Tension set).

TABLE 6

| T (°C.) | time (sec) | Hardness (Shore) | tensile stress (MPa) | ultimate elongation (%) | tension set (%) |
|---|---|---|---|---|---|
| 190 | 65 | 45 | 12.5 | 420 | 13 |
| 190 | 120 | 49 | 16.0 | 360 | 10 |
| 215 | 20 | 33 | 11.5 | 450 | 14 |
| 215 | 40 | 44 | 13.2 | 400 | 13 |
| 215 | 65 | 48 | 15.5 | 360 | 11 |
| 240 | 10 | 45 | 12.0 | 430 | 12 |
| 240 | 20 | 47 | 14.1 | 390 | 11 |
| 240 | 40 | 47 | 14.0 | 350 | 11 |

When the reticulation was over, the specimens had a dry, unsticky aspect, moreover, they presented considerably better surface properties in comparison with those obtained by reticulation at the same temperature in a melted salt bath by percolation in vapor phase. In fact, cured articles were obtained, wherein total lack of bubbles and of surface roughness was noted.

EXAMPLE 6

Dicumyl peroxie (PEROXIMON DC ®) as cross linking agent, triallyl cyanurate as co-cross linking agent and an antioxidant (ANOX HB ®) were added to a "low density" polyethylene having melt flow index 2 according to the following formula:

| | |
|---|---|
| PE | 100 parts by weight |
| Dycumyl peroxide | 2 parts by weight |
| T AC | 0.5 parts by weight |
| ANOX | 0.5 parts by weight |

The "compound" was shaped obtaining a specimen having section 10 cm×10 cm×2 mm.

Said shaped specimen was dipped into a bath containing FOMBLIN YR whose characteristics has been set forth in example 1.

The test was carried out at 165° C. for 30 minutes. The measurements were obtained according to ASTM 2765-68 Rules (Method A).

The weight loss due to the solvent for a non-cross linked specimen was 37.7% by weight, while the weight loss for the speciment treated according to our invention was 3.9%. Said value is lower than the value for a cross linked specimen carried out by press.

Abbreviations well known in the art for conventional polymeric materials are:
  XLPE: polyethylene with extra low density
  CPE: chlorinated polyethylene
  CSM: chlorosulfonated polyethylene

We claim:

1. A process for the thermal vulcanization of thermosetting resins or vulcanizable elastomers or polymers characterized in that an article to be vulcanized is brought into contact with a process liquid at a predetermined temperature for a time sufficient to obtain a complete vulcanization, said liquid belonging to the class of the perfluoropolyethers.

2. A process according to claim 1, wherein said thermosetting resins are selected from the class consisting of epoxy, polyurethane, acrylic, polybutadiene, polyimide, and polyester resins.

3. A process according to claim 1, wherein said perfluoropolyethers have a kinematic viscosity ranging from 10 to 2500 Cst at 20° C.

4. A process according to claim 1, wherein said liquids are perfluoropolyethers comprising one or more structural units of the following kind:
 (a) CF(CF$_3$)CF$_2$O and (CFXO) randomly distributed along the perfluoropolyether chain, wherein X is F or, CF$_3$;
 (b) CF(CF$_3$)CF$_2$O;
 (c) CF(CF$_3$)CF$_2$O or the characteristic group —CF(CF$_3$)—CF(CF$_3$)—;
 (d) CF(CF$_3$)CF$_2$O), (C$_2$F$_4$O) (CFXO) randomly distributed along the perfluoropolyether chain, wherein X is F or CF$_3$;
 (e) (C$_2$F$_4$O), (CF$_2$O) randomly distributed along the perfluoropolyether chain;
 (f) (CF$_2$—CF$_2$—CF$_2$O);
 (g) (C$_2$F$_4$O);

(h) 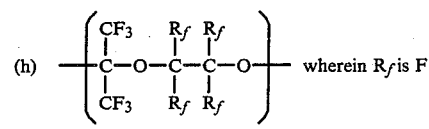 wherein R$_f$ is F wherein R$_f$ is F or a perfluoroalkyl radical.

5. A process for the thermal vulcanization of thermosetting resins or vulcanizable elastomers characterised in that an article to be vulcanized is brought into contact with a perfluoropolyether, and said thermal vulcanization is carried out in combination simultaneously or in sequence with electronic radiations, U.V. rays, microwaves or ultrasounds energy, these kinds of alternative energy being used singly or together.

6. A process according to claim 5 wherein said polymers are crosslinkable polymers selected from the group consisting of extra low density polyethylene, chlorinated polyethylene, and chlorosulfonated polyethylene.

* * * * *